US012709380B2

(12) United States Patent
Wu et al.

(10) Patent No.: US 12,709,380 B2
(45) Date of Patent: Aug. 18, 2026

(54) ELECTRICAL SERVO SYSTEM FOR A FLIGHT CONTROL SURFACE, METHOD OF DETECTING SENSOR FAILURE, AND METHOD FOR DETERMINING CORRECT FUNCTION OF A MOVEMENT RELATED FLIGHT CONTROL SURFACE SENSOR

(71) Applicant: Archer Aviation Inc., San Jose, CA (US)

(72) Inventors: Eric Wu, Munich (DE); Philipp Wurdak, Munich (DE)

(73) Assignee: ARCHER AVIATION INC., San Jose, CA (US)

( * ) Notice: Subject to any disclaimer, the term of this patent is extended or adjusted under 35 U.S.C. 154(b) by 163 days.

(21) Appl. No.: 18/602,897

(22) Filed: Mar. 12, 2024

(65) Prior Publication Data

US 2025/0223027 A1 Jul. 10, 2025

(30) Foreign Application Priority Data

Mar. 22, 2023 (EP) .................................... 23163563

(51) Int. Cl.
*B64C 13/50* (2006.01)

(52) U.S. Cl.
CPC .................................... *B64C 13/50* (2013.01)

(58) Field of Classification Search
CPC ... B64C 13/50; B64C 11/001; B64C 29/0033; B64C 39/12; B64D 27/34; B64D 45/00;
(Continued)

(56) References Cited

U.S. PATENT DOCUMENTS 11,215,123 B2 * 1/2022 Adams .................... F04D 19/02
2003/0127569 A1 * 7/2003 Bacon .................. B64C 13/505 244/195

(Continued)

FOREIGN PATENT DOCUMENTS

KR 10-1989161 6/2019

OTHER PUBLICATIONS

European Partial Search Report and Opinion for Application No. 23163563 dated Aug. 22, 2023, 13 pages.

(Continued)

*Primary Examiner* — Donald J Wallace
*Assistant Examiner* — Jalal C Coduroglu
(74) *Attorney, Agent, or Firm* — Finnegan, Henderson, Farabow, Garrett & Dunner, LLP

(57) ABSTRACT

Electrical servo system for a flight control surface comprising: a flight control surface moveable with respect to a mounting portion; an electric actuator configured to actuate the flight control surface; at least one movement-related flight control surface sensor, which is configured to acquire a quantity related to a movement of the flight control surface; at least one movement-related actuator sensor, which is configured to acquire a quantity related to a movement of the actuator. In order to enhance control accuracy, a controller is provided, which is configured to control according to a cascaded closed loop control, wherein the at least one movement-related flight control surface sensor is used in an outer closed loop control for movement control of the flight control surface, and the at least one movement-related actuator sensor is used in an inner closed loop control for movement control of the actuator.

20 Claims, 4 Drawing Sheets

(58) Field of Classification Search
CPC ........ B64D 45/0005; B64D 2045/0085; B64D 43/00; B64F 5/60
See application file for complete search history.

(56) References Cited

U.S. PATENT DOCUMENTS

| | | | | |
|---|---|---|---|---|
| 2013/0026287 | A1* | 1/2013 | Goupil | B64D 45/0005 244/99.9 |
| 2013/0334372 | A1 | 12/2013 | Marques et al. | |
| 2015/0197347 | A1 | 7/2015 | Moy et al. | |
| 2016/0046369 | A1* | 2/2016 | Watkins | B64C 27/24 244/7 A |
| 2017/0109946 | A1 | 4/2017 | Goupil et al. | |
| 2018/0362147 | A1 | 12/2018 | Huynh et al. | |
| 2021/0179297 | A1 | 6/2021 | Köhler | |
| 2021/0253223 | A1* | 8/2021 | Mezzino | B64C 13/505 |
| 2022/0260361 | A1* | 8/2022 | Konyndyk | G07C 5/008 |
| 2022/0266987 | A1 | 8/2022 | Möbius et al. | |
| 2022/0402597 | A1* | 12/2022 | Meyer-Brügel | B64C 13/50 |
| 2023/0365268 | A1* | 11/2023 | Resnick | B64D 35/023 |
| 2024/0336374 | A1* | 10/2024 | Brady | B64C 13/40 |

OTHER PUBLICATIONS

European Search Report and Opinion for Application No. 23163563 dated Nov. 6, 2023, 32 pages.

Urdiroz, Albert., The Importance of the Pre-Flight, Flight Controls Check, safetyfirst.airbus.com, Safety First #1, (Jan. 2005), 7 pages.

* cited by examiner

ELECTRICAL SERVO SYSTEM FOR A FLIGHT CONTROL SURFACE, METHOD OF DETECTING SENSOR FAILURE, AND METHOD FOR DETERMINING CORRECT FUNCTION OF A MOVEMENT RELATED FLIGHT CONTROL SURFACE SENSOR

PRIORITY CLAIM

This application claims the benefit of the filing date of European Patent Application Serial No. EP23163563.2, filed Mar. 22, 2023, for "Electrical Servo System for a Flight Control Surface, Method of Detecting Sensor Failure, and Method for Determining Correct Function of a Movement Related Flight Control Surface Sensor," the entire disclosure of which is hereby incorporated herein in its entirety by this reference.

TECHNICAL FIELD

The present disclosure relates to an electrical servo system for a flight control surface, a method of detecting sensor failure, and a method for determining correct function of a movement-related flight control surface sensor.

BACKGROUND

From the prior art, for example, US 2022 266 987A1, an electrical servo system for a flap is known. The flap is moveable with respect to a mounting portion such as an aircraft wing. Further, an electric actuator, in particular, a motor is configured to actuate the flight control surface. The motor is configured as a servo motor and thus is coupled to a controller, which enables position control of the flight control surface with respect to the mounting portion.

However, in the prior art, non-linear effects and deformations, in particular, torsional deformations, in a drive train between the actuator and the flight control surface may lead to deviations between a target position and an actual position of the flight control surface.

Thus, control of the flight control surface may be inaccurate despite the servo motor, and sensor failure of the servo motor cannot be detected.

BRIEF SUMMARY

It is therefore an object of the present disclosure to provide an electrical servo system for a flight control surface with increased control accuracy, and detecting sensor failure in an electrical servo system and ensuring proper operation of a movement-related flight control surface sensor.

According to an aspect disclosed herein, there is provided an electrical servo system for a flight control surface, comprising: a flight control surface moveable with respect to a mounting portion; an electric actuator configured to actuate the flight control surface.

The present disclosure is particularly characterized by the electrical servo system further comprising: at least one movement-related flight control surface sensor, which is configured to acquire a quantity related to a movement of the flight control surface, preferably a position; at least one movement-related actuator sensor, which is configured to acquire a quantity related to a movement of the actuator, preferably a position; and at least one controller being configured to control according to a cascaded closed loop control, wherein the at least one movement-related flight control surface sensor is used in an outer closed loop control for movement control of the flight control surface, and the at least one movement-related actuator sensor is used in an inner closed loop control for movement control of the actuator.

According thereto, two different sensors, namely the movement-related flight control surface sensor and the movement-related actuator sensor are provided, which acquire different movement information. That is, the movement-related flight control surface sensor acquires a quantity related to the movement of the flight control surface with respect to the mounting portion, while the movement-related actuator sensor acquires a quantity related to the movement of the actuator, in particular, of an output portion (rotor) to an input portion (stator). Both sensors can thus provide an indirect or direct feedback quantity regarding the respective target quantity.

The output of both sensors is used in a cascaded closed loop control. Thus, the closed loop control for movement control of the flight control surface, in which the movement-related flight control surface sensor is used, can resort to an inner closed loop control for movement control of the actuator, in which the movement-related actuator sensor is used. Thus, control accuracy can be enhanced. In particular, the target quantity of the inner closed loop control may be the adjusted quantity of the outer closed loop control. Thus, the adjustment in the outer control loop regarding the movement of the flight control surface can be more accurate.

It is to be noted that the at least one controller may continuously perform both control loops, preferably at least temporarily simultaneously.

In the present disclosure, the movement-related actuator sensor may be a commutation sensor determining a position of the output portion. A commutation sensor is particularly used in asynchronous rotary electric machines.

Further, the flight control surface means a surface that enables attitude control around at least one axis of the aerial vehicle. In particular, the flight control surface may be a primary flight control surface, such as an aileron, rudder, or elevator. The flight control surface may also be a secondary flight control surface, such as a flap, slat, or a spoiler.

Preferably, the at least one movement-related flight control surface sensor is used in a position control of the flight control surface.

Thus, the position of the flight control surface can be controlled directly.

Alternatively or additionally, the at least one movement-related actuator sensor may be used in a speed control of the actuator, wherein preferably the speed of the actuator is adjusted for the position control of the flight control surface.

Thus, the position of the flight control surface can be adjusted by the speed of the actuator, and the adjustment quantity for the outer closed loop control can be controlled appropriately, and a proper feedback can be provided by the movement-related actuator sensor. In addition, disturbances such as non-linear behavior can be properly compensated.

Preferably, the flight control surface is pivotable with respect to the mounting portion, in particular, about an axis parallel to a transversal axis of the corresponding aerial vehicle.

Thus, an angular position of the pivotable flight control surface can be properly controlled. Also, in these kinds of flight control surfaces, aeroelastic phenomena and large aerodynamic and elastic forces may occur, such that proper control is particularly advantageous.

Preferably, the actuator comprises, more preferably is, a rotary electric machine, in particular, an electric motor.

Thus, the movement-related actuator sensor can detect an angular position of the rotary electric machine. In addition, a rotary torque can be provided for pivoting the flight control surface, and the electrical servo system can be kept compact.

According to a particular aspect, a transmission, preferably a speed reducing transmission, may be interposed between the electric actuator and the flight control surface.

Thus, an actuator force can be properly transmitted to the flight control surface. Further, by means of the transmission, deviations may occur between the movement of the actuator and the movement of the flight control surface due to deformations such as torsional deformations and non-linear effects.

Preferably, the movement-related flight control surface sensor is configured to acquire a quantity related to the movement of the most downstream portion of a drive path from the electric actuator to the flight control surface.

Thus, the movement of the flight control surface can be directly fed back by the movement-related flight control surface sensor. The most downstream portion is a portion moving integrally with the flight control surface.

Preferably, the electric actuator is coupled to the mounting portion, and the movement-related actuator sensor is preferably configured to acquire a quantity related to the movement of an output portion of the electric actuator.

Thus, the movement with respect to the same mounting portion as the flight control surface and the movement of the output portion can be detected by the movement-related actuator sensor. The output portion may be the most upstream portion of the drivetrain to the flight control surface, which moves with respect to an input (stator) portion, in particular, the input portion coupled to the mounting portion. Thereby, it can be ensured that the sensor output is independent of a transmission ratio.

Preferably, at least two movement-related flight control surface sensors are provided for the same flight control surface.

Thus, redundancy in the system can be provided, and movement control of the flight control surface can be provided even if one sensor fails. The two sensors may detect the same quantity and be provided to detect movement of the same portion of the flight control surface.

According to another aspect, a method of detecting sensor failure in an aerial vehicle, particularly in an electrical servo system of the above kind, is provided. The aerial vehicle comprises: a flight control surface moveable with respect to a mounting portion; an electric actuator configured to actuate the flight control surface; at least one movement-related flight control surface sensor, which is configured to acquire a quantity related to a movement of the flight control surface, preferably a position; at least one movement-related actuator sensor, which is configured to acquire a quantity related to a movement of the actuator, preferably a position. The method is particularly characterized in that the method comprises at least the step of determining sensor failure based on an output of the movement-related flight control surface sensor and an output of the movement-related actuator sensor.

Thus, the two sensors, in particular, the sensors presented above, can be used to determine sensor failure. That is, the output of two different sensors can be used and compared, and consequently, sensor failure can be determined. It is preferable if the sensors acquire the same type of quantity, for example, a position.

Sensor failure may be determined if a correlation of compared quantities based on the sensor outputs does not comply with a predetermined correlation within a certain tolerance.

Preferably, the method comprises the step of calibrating the movement-related actuator sensor and the movement-related flight control surface sensor against each other at a certain position within a moveable range of the flight control surface, in particular, at an end position thereof, thereby obtaining an actuator reference position and a flight control surface reference position.

Thus, a respective reference position can be provided which applies at least for one use cycle of the flight control surface. Thereby, it can be ensured that the two sensors are aligned with each other. For example, the sensors may be reset to a certain value, for example, zero, at the certain position, or a predetermined correlation may be determined at the certain position. In addition, if a speed reducing transmission is provided, the actuator may perform more than one entire rotation such that the number of rotations can be determined with respect to the actuator reference position.

Preferably, determining sensor failure comprises the steps of determining a correlation between a relative movement, preferably with respect to the actuator reference position, of the electric actuator based on the output of the movement-related actuator sensor and a relative movement, preferably with respect to the flight control surface reference position, of the flight control surface based on the output of the movement-related flight control surface sensor, and comparing the correlation against a predetermined correlation, in particular, a proportional correlation.

Thereby, the failure sensor can be determined if the determined correlation does not match the predetermined correlation, which is preferably constant over the entire moveable range of the flight control surface.

Preferably, upon determining failure of one of the sensors, movement of the flight control surface is disabled, or only one appropriate of the two movement-related flight control surface sensors is used in movement control of the flight control surface.

Thus, in case failure occurs, erroneous control can be avoided. In the case of two movement-related flight control surface sensors, control can be continued with the properly working sensor, in particular, the sensor for which the predetermined correlation is met.

According to still another aspect, a method for determining correct function of a movement-related flight control surface sensor, which is configured to acquire a quantity related to a movement of the flight control surface is provided, wherein the flight control surface is moveable in a moveable range defined by two end positions, the method comprises the steps of detecting an extent of the moveable range; moving the flight control surface to one end position and to the other end position and acquiring the quantity related to the movement of the flight control surface by means of the movement-related flight control surface sensor at least temporarily during the movement; determining the extent of the moveable range based on an output of the movement-related flight control surface sensor; and comparing the determined extent of the moveable range to the detected extent.

According thereto, since the moveable range is determined by the movement-related flight control surface sensor and compared according to a previously detected moveable range, which is detected, for example, in a pre-use state of the flight control surface, such as installation, the proper operation of the sensor can be determined. The detected extent may be detected based on the designed end positions by calculation or by another sensor. The determined extent may be determined in a ready-for-flight state, for example, in a pre-check phase immediately before flight.

Preferably, the detected extent of the moveable range is stored in a memory.

Thus, the extent need only be detected once and can be made available for every time determination of proper operation of the movement-related flight control surface sensor is required.

Preferably, in the method of detecting sensor failure described above, first, the method for determining correct function of the movement-related flight control surface sensor is performed.

Thus, proper initial operation of the movement-related flight control surface sensor can be determined. Consequently, failure of one of the movement-related actuator sensor and the movement-related flight control surface sensor can be reliably detected.

Further, according to the present disclosure, an aerial vehicle comprising the electrical servo system according to any of the above aspects, and/or at least one controller configured to perform the methods of any of the aspects can be performed.

Hence, the above-mentioned effects can be achieved in the aerial vehicle.

DETAILED DESCRIPTION

Figure 1:
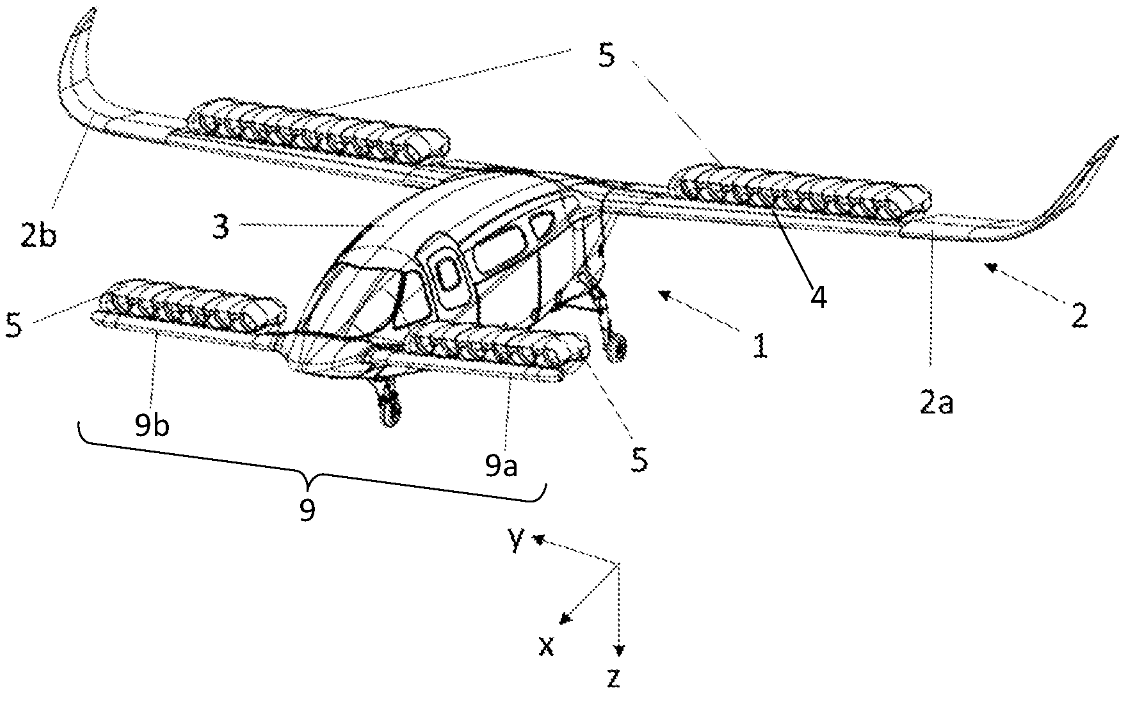
FIG. 1 shows a perspective view of an aerial vehicle to which the present disclosure can be applied.

In the drawings, a longitudinal axis of the aerial vehicle is designated as the x-axis. A transversal axis, which extends along the wing span is designated as the y-axis, and a vertical axis, which forms an orthogonal right hand system with the x- and y-axis, is designated as the z-axis.

FIG. 1 shows an aerial vehicle that is designated by reference numeral 1 in perspective view. The aerial vehicle 1 comprises a wing 2. In particular, the aerial vehicle 1 comprises a left wing 2*a* and a right wing 2*b* extending on both sides of the x-axis of a fuselage 3, respectively, along an axis parallel to the y-axis of the aerial vehicle 1.

In addition, the aerial vehicle 1 comprises a canard 9. In particular, a left canard 9*a* and a right canard 9*b* are provided to both sides of the x-axis in front of the wings 2*a* and 2*b*. Propulsion units 5 are attached to a rear portion, in particular, to a rear end portion such as a trailing edge of the canards 9*a*, 9*b*.

Figure 2:
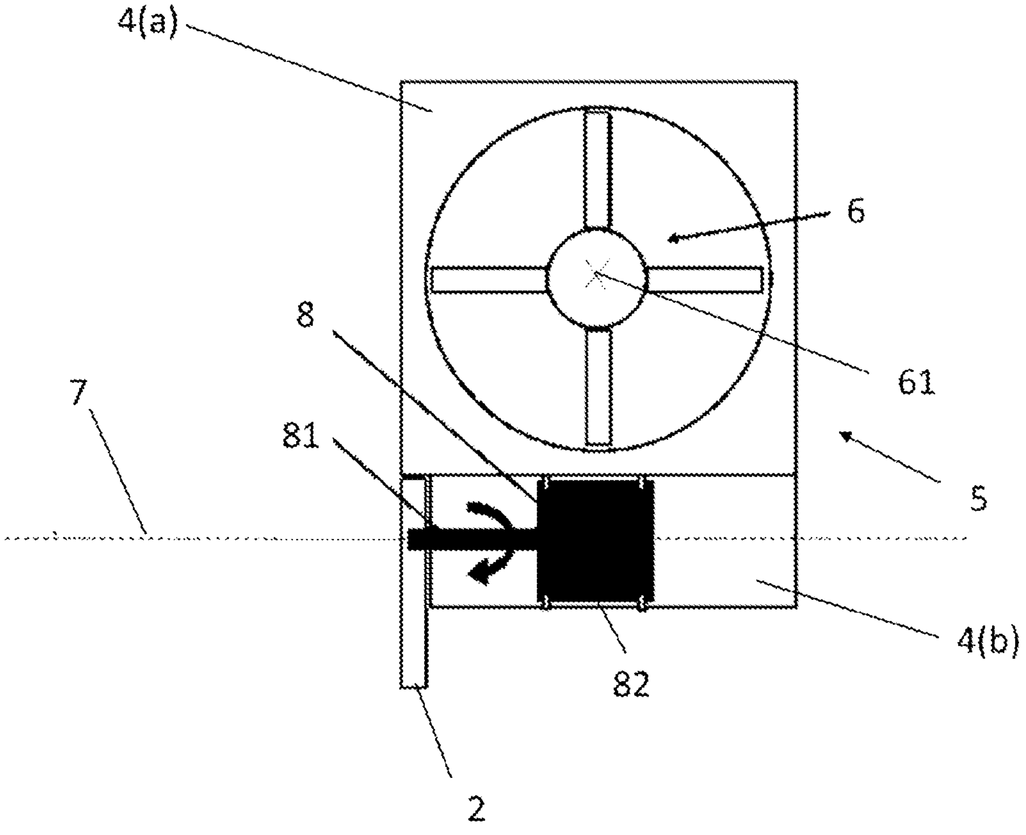
FIG. 2 shows a schematic view of a flap arrangement of the aerial vehicle.

On both of the left and right wings 2*a* and 2*b*, a plurality of flaps 4 are attached. The flap 4 is one example of the flight control surface according to the present disclosure. The flaps 4 are respectively coupled to move integrally with a propulsion unit 5 in the present embodiment. In particular, the propulsion unit 5 comprises the flap 4. In other words, the flap 4 forms part of the flight control surface, in particular, forms a duct of a ducted fan 6, as shown in FIG. 2, wherein the fan 6 is a propulsion rotor of the propulsion unit 5.

The flap 4 is formed by an upper and lower duct part 4*a* and 4*b*, which are located at an upper and lower side of a central axis 61 of the propulsion unit 5, which is an axis of rotation of the fan 6. The flight control surface is thus exemplarily formed as a lift generating body or a lift modifying body, which generates lift or modifies the lift generated by the wings 2. For example, the duct parts 4*a* and 4*b* may have a profile generating lift at an angle of attack of the inflowing air being zero.

However, the present disclosure may also be applied to a flight control surface not coupled to move integrally with a propulsion unit 5. Thus, if in the following, the arrangement and the movement of the propulsion units 5 are described, this also applies to the flaps 4 in isolation. For example, the flap may also be formed only by the lower duct part 4*b*, whose chord is preferably continuous with the chord of the wing.

The propulsion units 5 (including flaps 4) are attached to a rear portion, in particular, a rear end portion, such as a trailing edge, of the wings 2. The plurality of propulsion units 5 are aligned along an axis parallel to the y-axis of the aerial vehicle 1. In particular, the propulsion units 5 are arrayed along an arrangement direction, which is aligned with the y-axis of the aerial vehicle 1.

The propulsion units 5 (including flaps 4) are attached to be pivotable about an axis 7 parallel to the y-axis. In particular, the propulsion units 5 are pivotable between a substantially horizontal orientation (cruise flight mode shown in FIG. 1) and a substantially vertical orientation (take-off or hover flight mode). On the wings 2*a* and 2*b*, an array of nine propulsion units 5 is provided, respectively.

The arrangement of the propulsion units 5 at the canard 9 is substantially the same, while six propulsion units 5 are provided to form an array, respectively.

At least one actuator 8, as shown in FIG. 2, is provided for each propulsion unit 5 to set the orientation, that is, the angular position, of the propulsion unit 5 with respect to the wing 2, which is one example of the mounting portion, while the canard 9, is another example. It is to be noted that at least some of the propulsion units 5 (including flaps 4) of the array of propulsion units 5 may form an integral unit, which is actuated by at least one actuator. However, it is preferable that some, preferably all, propulsion units 5 may be pivoted individually and independently from the others by a respective actuator 8. The propulsion units 5 of each array are preferably pivoted synchronously, that is, their orientation with respect to the wing 2 or canard may be the same.

The propulsion units 5 on the wing 2 and the canard 9 may be different in configuration, in particular, in terms of size, drive type, and maximum thrust.

The propulsion rotor, that is, the fan 6 may be electrically driven by a rotary electric machine such as an electric motor. The fan 6 can generate a thrust by rotation about the rotation axis 61 driven by the electric motor. The rotation of the fan 6 sucks air along an airflow direction, which is substantially parallel to the rotation axis 61. The rotation axis 61 is also a thrust axis, which is preferably spaced apart from the pivot axis 7. That is, the thrust axis 61 preferably has a lever arm to the pivot axis 7. In the horizontal orientation, the axis 61 is substantially aligned with the x-axis. It is to be noted that in hover flight, the axis 61 may be aligned with the z-axis.

The aerial vehicle 1 is of a vertical-take-off-and-landing type. The propulsion units 5 (including flaps 4) may thus be configured to pivot in a moveable range of at least 90°, preferably 110°, more preferably 160°, at least between the horizontal orientation and the vertical orientation. The end positions of the moveable range may be respectively defined by mechanical stops.

The actuator 8 is an electric actuator and is a rotary electric machine, in particular, an electric motor, preferably an asynchronous motor. The axis of the electric actuator 8 is coaxial with the pivot axis 7. An input portion (stator) 81 is coupled with the wing 2, and an output portion (rotor) 82 is coupled with the lower duct part 4*b* (of the flap 4), which is particularly accommodated therein.

A transmission (not shown), in particular, a speed reducing transmission, may be interposed between the rotor 82 and the flap 4, in particular, the lower duct part 4*b*. For example, the transmission may comprise or be a planetary gear and/or an oscillatory gear. The transmission may have a transmission ratio of at least 4:1, preferably 8:1. For example, the rotor 82 may perform more than one entire revolution, while the propulsion unit 5 pivots between the horizontal orientation and the vertical orientation.

A commutation sensor, which is an example of the movement-related actuator sensor, is arranged to acquire an angular position of the rotor 82. For example, the commutation sensor may be a hall sensor, which is arranged on the stator 81, while at least one magnet may be rotating integrally with the rotor 82, the rotation of which is detected by the commutation sensor. However, other sensor types and arrangements are possible. The rotor 82 is the most upstream portion of a drivetrain between the wing 2 and the lower duct part 4*b*, which rotates with respect to the mounting portion.

On the other hand, a flight control surface position sensor (in the following CSPS) is arranged to acquire an angular position of the flap 4 with respect to the mounting portion (wing). The CSPS is preferably arranged directly between the mounting portion and the flap 4. For example, the CSPS may be arranged at the mounting portion (for example, as a hall sensor) and acquire movement information of the lower duct part 4*b* rotating with respect thereto. In particular, the CSPS may be arranged to acquire a position of the most downstream portion (the most downstream portion of the transmission rotating integrally with the lower duct part 4*b* or the lower duct part 4*b* itself). Thereby, the CSPS can detect the angular position directly. However, the CSPS may be arranged to detect movement information of another portion within the transmission with respect to the mounting portion.

It is to be noted that at least two CSPS can be provided, preferably at the same portion of the drivetrain and to acquire a relative movement between the same portions, one of which is the mounting portion.

Figure 3:
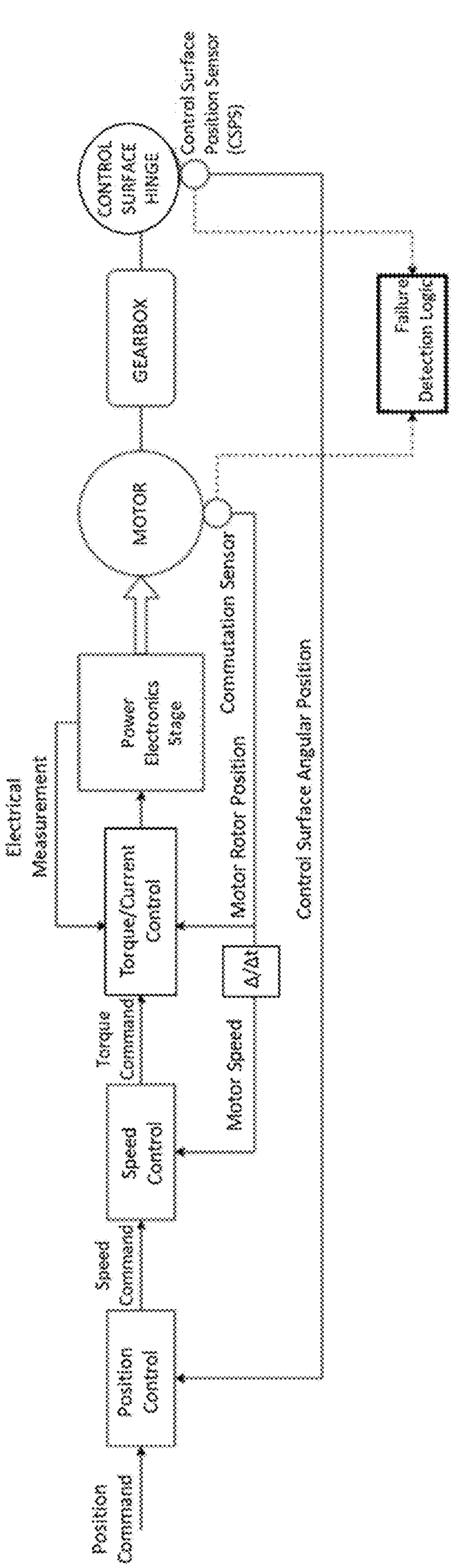
FIG. 3 shows a closed loop control, which can be performed by a controller according to the present disclosure.

The aerial vehicle further comprises at least one controller (not shown). The at least one controller is a hardware component programmed with software and comprises a processing unit such as a CPU. The at least one controller may be one unit or several units communicating with each other, and controls the movement of the flap(s) 4 with respect to the mounting portion based on a closed loop control using the commutation sensor and the at least one CSPS. Details of the control are shown in FIG. 3, and described in the following.

The at least one controller may comprise a memory in which position commands/position target values are stored. Depending on the flight state, the at least one controller issues the position target value, which is a certain angular position of the flap 4 with respect to the mounting portion. A position of the flight control surface with respect to the mounting portion, that is, at the control surface hinge (see FIG. 3) is fed back via the CSPS, thereby enabling position control.

In the outer loop, speed is adjusted, wherein a certain speed command is issued regarding the speed of the electric actuator 8. The speed itself is controlled in an inner closed control loop, where the speed is the target quantity. The speed of the actuator 8 is controlled by adjusting the torque or current of the actuator 8, where the torque or current of the actuator 8 is the target quantity in an innermost loop. A power electronic stage comprising transistors may be provided to be adjusted for controlling the current or torque output of the actuator 8 in the innermost closed control loop.

In the inner loop, the commutation sensor feeds back to a position of the rotor position of the actuator 8. The controller may have a derivative unit, which calculates the speed as a derivative of the position.

In the innermost closed control loop, the position of the actuator 8 is fed back together with sensor output regarding the measurement of the power electronics. Thereby, the current value or the torque value may be calculated based on the electric information of the power electronics and the position of the rotor 82.

It is to be noted that a controller may be provided for each of the outer, inner, and innermost loop. However, at least two of these loops may be implemented in one controller. The controller(s) issue respective target values/commands and may exhibit at least one control function for each loop, such as a P, I or PID control. The controller(s) may be arranged at the aerial vehicle, in particular, at the mounting portion or the flight control surface. The controller performing the control using the output of the commutation sensor may be integrated with the stator 81.

In the above control, three closed control loops are provided as a cascaded closed loop control. A position of the flight control surface is controlled, wherein the speed of the actuator 8 is the adjusted quantity and the position of the flight control surface is fed back by the CSPS, the speed itself is controlled by adjusting the current/torque of the actuator and is fed back as a derivative of the output of the commutation sensor, and the torque/current itself is controlled by adjusting power electronic settings and feeding back the output of the commutation sensor and the power electronic settings.

Thus, in the closed loop control according to the present disclosure, the commutation sensor and the CSPS are provided. Thus, control can be performed more accurately. In particular, the two sensors provide output regarding the movement of two different portions on the drivetrain between the mounting portion and the flight control surface. The sensors are used in cascaded control loops. Thus, the adjusted quantity of the outer loop can be determined more accurately, and control can be enhanced. The closed loop control is preferably performed as real time control. In particular, it can be accurately reacted to disturbance quantities such as any of aerodynamic, gravity, mechanical, and propulsion loads, which act on the electrical servo system according to the present disclosure.

It is to be noted that the at least one controller that is configured to perform the cascaded loop control, the flap 4, the actuator 8, the commutation sensor, and the CSPS are part of an electrical servo system according to the present disclosure.

In such an electric servo system, but also in other applications where a movement-related actuator sensor and a movement-related flight control surface sensor are provided, a method of detecting failure sensor (the sensor failure detection logic in FIG. 3) according to the present disclosure may be applied. Such a method is exemplarily shown in detail in FIG. 4.

In a first step S1, a pre-flight check may be performed in a ready-to-use state of the flight control surface, for example, on the taxiway before taxiing. At this time, the flight control surface is moved to respective end positions. Thereby, it can be ensured that no obstacles are within the entire trajectory of the flight control surface such that the flight control surface is ready to use. The end positions are particularly defined by mechanical stops, such that they are well-defined, as described above. During that movement, the movement-related information is acquired by the CSPS, at least at the end positions.

That is, as a result of S1, an extent of the moveable range can be determined. Here, the absolute value of the sensor output at the respective end positions is not important since the movement between the two end positions allows the determination of the extent as a relative quantity.

In a step S2, it is determined if the determined extent of the moveable range complies with a previously detected range, which has been detected in a pre-use state such as installation by means of other sensors, or is the range corresponding to design end positions, for example, the above-mentioned end positions that define the moveable range. Of course, a certain tolerance may be applied.

If this is not the case (S2: NO), it can be determined that the CSPS is not working properly or an obstacle is in the moveable range such that the flight control surface is jammed.

If this is the case (S2: YES), the proper operation of the CSPS is determined and the output of the CSPS and the commutation sensor is compared (S3). After determining the proper operation of the CSPS, the CSPS and the commutation sensor may be calibrated at a certain position, preferably an end position of the moveable range. Of course, the respective sensor outputs may vary from each other at the certain position. The certain position of the moveable range may be stored as an actuator reference position and a flight control surface reference position. With the reference positions obtained, any movement of the actuator 8 and flight control surface 4 acquired by the respective sensors can be determined as a relative movement with respect to the respective reference position.

Then, while performing the position control, for example, according to the closed loop control of FIG. 3, the outputs of the two sensors may be continuously compared. The sensor output of the commutation sensor is indicative of a relative position, that is, a relative movement, with respect to a certain reference position, which may be the actuator reference position if the output has been reset at the actuator reference position, but also any other reference position of the actuator 8. The sensor output of the CSPS is indicative of a relative position, that is, a relative movement, with respect to a certain reference position, which may be the aforementioned flight control surface reference position if the output has been reset at the flight control surface reference position, but also any other reference position of the flight control surface 4. In other words, a relative movement of the actuator 8 and the flight control surface 4 may be directly indicated by the respective sensor outputs if, at the maximum, only one revolution is performed. In the case of performing several revolutions, the relative movement cannot be directly obtained as the sensor output, but needs to be calculated with respect to the reference position.

In a step S4, it is determined if a correlation (ratio) of the respective relative movements complies with a predetermined correlation (ratio), determined in advance, and preferably stored in a memory, such as the transmission ratio, which is a proportional ratio. A certain tolerance may be applied to the predetermined correlation such that the correlation falls within a predetermined correlation range, including at least the predetermined correlation.

If this is not the case (S4: NO), it is determined that a failure has occurred, in particular, a sensor failure of the CSPS or the commutation sensor, or a mechanical failure in the drivetrain. Then, movement of the flight control surface 4 with respect to the mounting portion may be disabled, for example, by a brake to the electric actuator, or an engagement mechanism, which fixes the flight control surface.

In case two CSPS are provided for the same flight control surface, one of the CSPS may be determined to work properly since it complies with the predetermined correlation, and control may be performed with this sensor.

Otherwise (S4: YES), the control according to FIG. 3 can be continuously performed, and the sensor outputs are continuously compared. In other words, S3 is performed again, without the calibrating step.

In the above method, the steps S1 and S2 have been performed. However, the proper operation of the CSPS may be performed independently from the method shown in FIG. 4.

The above method steps can be performed by the same or a different at least one controller that performs the closed loop control according to FIG. 3. Thus, according to the present disclosure, at least one controller may be provided to perform the method of detecting sensor failure or the method of determining proper operation of the sensor. The present disclosure thus also considers a computer program, which when running on a computer performs any of these methods.

Above, a commutation sensor has been described as the movement-related actuator sensor, and the CSPS has been described as the movement-related flight control surface sensor, wherein both sensors allow direct acquisition of positional information as the type of quantity. However, any other sensor allowing the acquirement of movement-related information can be used for either sensor. In particular, any sensor allowing the, preferably direct, acquisition of a kinetic and/or kinematic quantity may be used. For example, speed, acceleration, force, inertia, etc. may be acquired. Preferably, both sensors acquire the same type of quantity. The output may be transferred into a position information based on calculation, for example, by integration. In this case, the sensor may further include a calculation unit.

It is also to be noted that the respective target/controlled quantities in the closed loop control of FIG. 3 may be different. For example, it is possible to set the position of the flight control surface as target/controlled quantity in the outer loop and the position of the actuator 8 as the target/controlled quantity in the inner loop. Even then, it is possible to increase accuracy as deformations and non-linear effects can be compensated.

Figure 4:
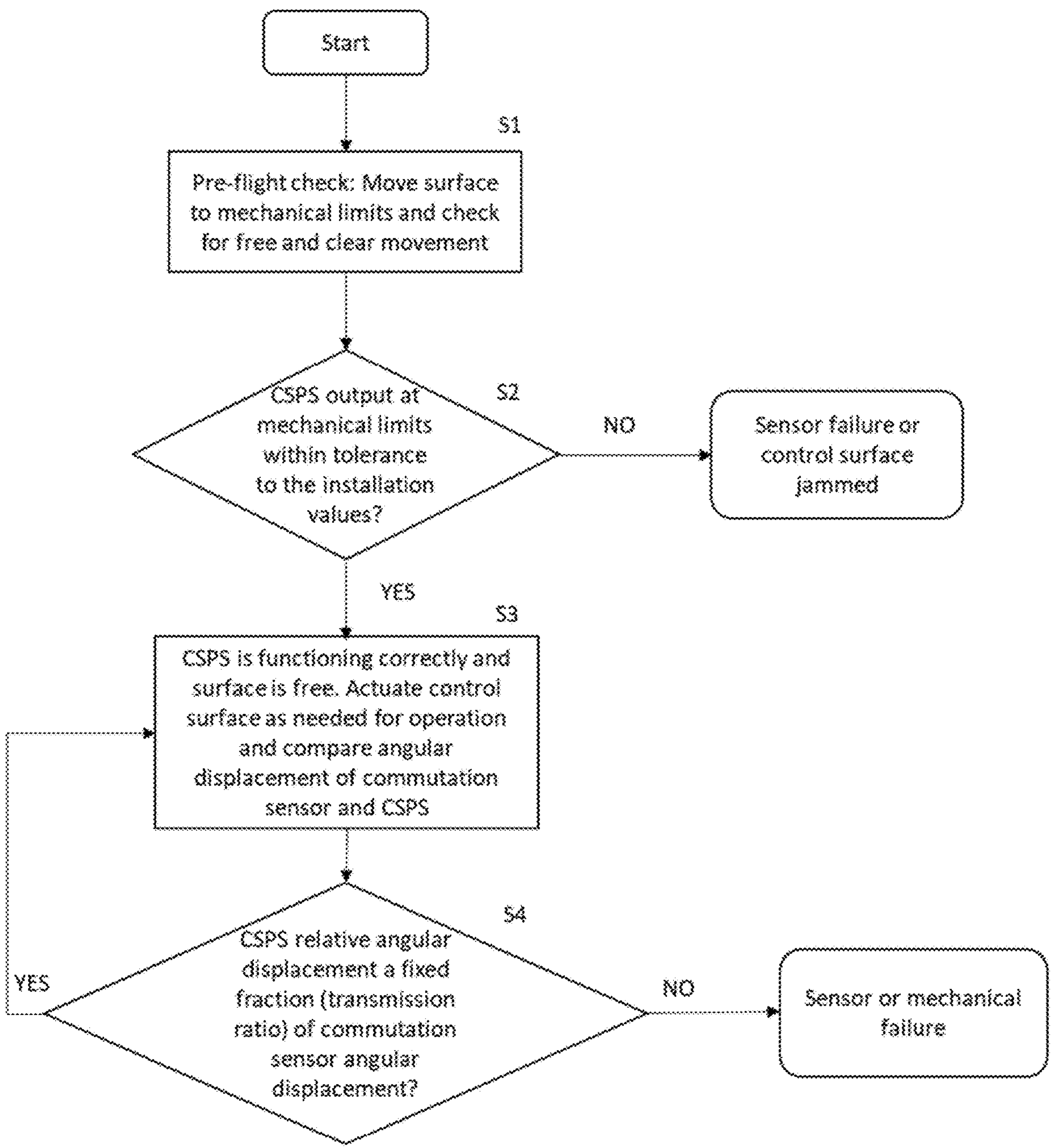
FIG. 4 shows a flowchart of a process of detecting sensor failure according to the present disclosure.

Furthermore, in FIG. 4, the correlation of the relative movement has been determined based on the position information, which indicates the relative movement. However, for example, a correlation of the relative movement may also be determined in terms of speed. In such a case, the calibrating step may be omitted since no reference position needs to be obtained.

The mounting portion may be the fuselage 3 or any other part of the aerial vehicle and may be part of the electrical servo system.

In the present disclosure, the term "at least" can mean only the specified number or the respective entirety, unless otherwise clearly specified.

What is claimed is:

1. A control system for a flight control surface, comprising:
a flight control surface moveable with respect to a mounting portion;
an electric actuator configured to actuate the flight control surface;
a movement-related flight control surface sensor, which is configured to acquire a quantity related to a movement of the flight control surface;
a movement-related actuator sensor, which is configured to acquire a quantity related to a movement of the electric actuator; and
a controller configured to control according to a cascaded closed loop control, wherein the movement-related flight control surface sensor is used in an outer closed loop control for movement control of the flight control surface, and the movement-related actuator sensor is used in an inner closed loop control for movement control of the electric actuator.

2. The electrical servo system of claim 1, wherein:
the movement-related flight control surface sensor is used in a position control of the flight control surface, and
the movement-related actuator sensor is used in a speed control of the electric actuator.

3. The electrical servo system of claim 1, wherein the flight control surface is pivotable with respect to the mounting portion.

4. The electrical servo system of claim 1, wherein the electric actuator comprises a rotary electric machine.

5. The electrical servo system of claim 1, further comprising a transmission interposed between the electric actuator and the flight control surface.

6. The electrical servo system of claim 1, wherein the movement-related flight control surface sensor is configured to acquire a quantity related to movement of a most downstream portion of a drive path from the electric actuator to the flight control surface.

7. The electrical servo system of claim 1, wherein the electric actuator is coupled to the mounting portion.

8. The electrical servo system of claim 7, wherein the movement-related actuator sensor is configured to acquire a quantity related to movement of an output portion of the electric actuator.

9. The electrical servo system of claim 1, wherein the movement-related flight control surface sensor and the movement-related actuator sensor are provided for a single flight control surface.

10. The electrical servo system of claim 1, wherein the system is configured for use in an aerial vehicle.

11. The electrical servo system of claim 1, wherein
the movement-related flight control surface sensor is configured to acquire a quantity related to a position of the flight control surface, and
the movement-related actuator sensor is configured to acquire a quantity related to a position of the electric actuator.

12. The electrical servo system of claim 1, wherein the flight control surface is a surface that enables attitude control around at least one axis of an aerial vehicle.

13. A method of detecting sensor failure in an aerial vehicle, the aerial vehicle comprising:
a flight control surface moveable with respect to a mounting portion;
an electric actuator configured to actuate the flight control surface;
a movement-related flight control surface sensor, which is configured to acquire a quantity related to a movement of the flight control surface; and
a movement-related actuator sensor, which is configured to acquire a quantity related to a movement of the electric actuator;
the method comprising determining failure of the movement-related flight control sensor or the movement-related actuator sensor based on a correlation between an output of the movement-related flight control surface sensor and an output of the movement-related actuator sensor.

14. The method of claim 13, further comprising calibrating the movement-related actuator sensor and the movement-related flight control surface sensor against each other at a position within a moveable range of the flight control surface thereby obtaining an actuator reference position and a flight control surface reference position.

15. The method of claim 13, further comprising:
determining an effective correlation between a relative movement of the electric actuator and a relative movement of the flight control surface; and
comparing the effective correlation against a predetermined correlation,
wherein the relative movement of the electric actuator is determined based on the output of the movement-related actuator sensor and an actuator reference position;
wherein the relative movement of the flight control surface is determined based on the output of the movement-related flight control surface sensor and a flight control surface reference position; and
wherein the predetermined correlation is a correlation between a movement of the electric actuator and a movement of the flight control surface.

16. The method of claim 15, wherein the predetermined correlation is constant over a movable range of the flight control surface.

17. The method of claim 15, wherein the predetermined correlation is determined prior to determining the effective correlation.

18. The method of claim 13, further comprising:
disabling movement of the flight control surface upon determining failure of one of the movement-related flight control sensor and the movement-related actuator sensor.

19. The method of claim 13, further comprising:
at least two movement-related flight control sensors,
wherein upon determining failure of one movement-related flight control sensor, a non-failing movement-related flight control sensor is used to control movement of the flight control surface.

20. The method of claim 13, further comprising:
determining that the flight control surface is ready for use by moving the flight control surface to respective end positions of a movable range of the flight control surface.

* * * * *